Oct. 22, 1963     M. HONMA ETAL     3,107,981
APPARATUS FOR CONTROLLED COMBUSTION
Filed April 26, 1961
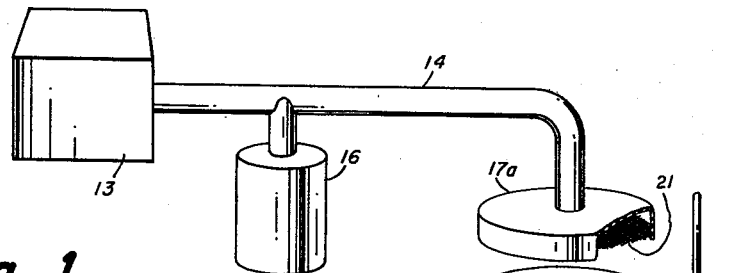
Fig. 1
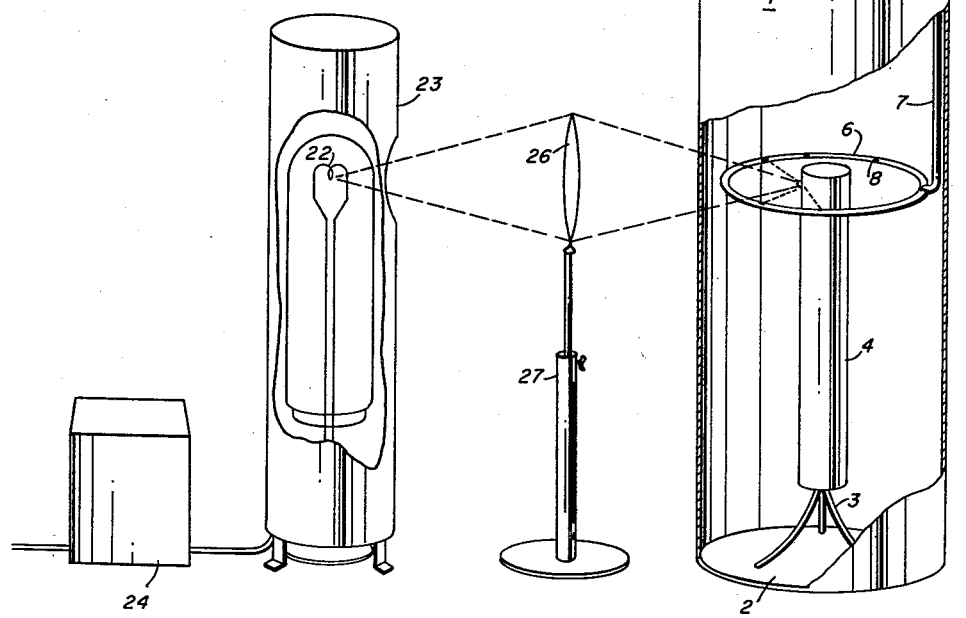
Fig. 2
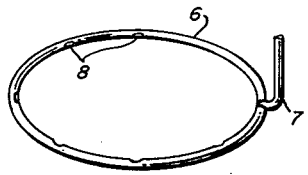
INVENTORS
MINORU (NMI) HONMA
ALLEN E. GREENDALE
BY
ATTORNEYS United States Patent Office 3,107,981
Patented Oct. 22, 1963

3,107,981
APPARATUS FOR CONTROLLED COMBUSTION
Minoru Honma, 280 Caiquita, Mountain View, Calif., and Allen E. Greendale, 2396 Road 20, San Pablo, Calif.
Filed Apr. 26, 1961, Ser. No. 105,830
7 Claims. (Cl. 23—253)
(Granted under Title 35, U.S. Code (1952), sec. 266)

The invention described herein may be manufactured and used by or for the Government of the United States of America for governmental purposes without the payment of any royalties thereon or therefor.

The present invention relates to controlled combustion and more in particular to apparatus and techniques for the controlled combustion of various materials such as paper, cloth and others.

It is a common practice in laboratories to carry out qualitative and quantitative analyses of various materials by oxidizing the materials and then collecting the different products of the resulting combusion. Several techniques conventionally are employed, one of these being what is known as a wet process in which reducing chemicals are employed. Another technique more pertinent to the present invention is known in contrast as the dry process in which the sample is oxidized or burned in its dry state.

In the dry oxidation technique, there are several well-recognized difficulties particularly when a precise quantitative analysis of the products of combustion is desired. For example, it is known that precaution must be taken to prevent the oxidizable material from bursting into flame since the ensuing turbulence causes significant losses in the weight of the ashed material. This problem is especially difficult in the initial step of igniting the material. Even in a process which utilizes a slower charring, there can be a loss of weight due to entrainment of the sample in the smoke. It readily is apparent that part of the problem could be resolved by employing an apparatus capable of completely containing the sample so as to make it possible to collect all of the products of combustion including the gaseous products. However, as far as presently is known, the only apparatus capable of performing in this manner is a bomb type combustion apparatus limited to small samples due to the pressures involved. Where the analysis is to be performed for relatively large samples, conventional oxidations, either dry or wet, are carried out open to the atmosphere and the resulting relative freedom permits oxidation products to escape with some loss of the sample.

A further problem in the oxidation analysis of samples arises when the samples are known or expected to contain toxic or radioactive particles or where the gaseous products may be toxic or radioactive. In such situations it is highly desirable for safety purposes to completely contain the combustion and, obviously, the conventional oxidation techniques which are carried out open to the atmosphere are hazardous and objectionable.

It is therefore an object of the present invention to provide a controlled combustion apparatus and method for oxidizing relatively large samples without loss of the sample or the products of combustion.

A related object is to provide an apparatus and technique for the dry oxidation of such samples in a completely enclosed and sealed system.

A further object is to provide an apparatus capable of safely oxidizing radioactive or toxic materials.

Yet another object of considerable significance is that of providing a means for igniting a sample in such a manner that the usual pressure surge upon ignition is kept within safe limits.

Another object is to provide unusually close control of both the ignition and rate of oxidation of the sample, the control permitting an essentially complete oxidation in a relatively expeditious manner.

Additional objects are to provide apparatus capable of accomplishing the foregoing objects in a simple, non-hazardous and relatively inexpensive manner. Other objects will become apparent in the ensuing detailed description and claims.

In a general manner the objects of the invention are accomplished by oxidizing the sample in an enclosed and sealed vessel, the interior pressure of which can be reduced in a controlled manner. Preferably, a sample such as cloth, paper or other similar materials, is mounted on a special holder disposed axially of the vessel, the vessel, most suitably, being cylindrical and the holder being adapted to dispose the sample in a roll form the axis of which extends axially of the cylinder. Oxygen, or other suitable gas, is directed at the sample through an appropriate arrangement such as a hollow perforated ring adapted to encircle the sample, one of the significant factors being that this ring and the sample are moveable relatively in a controlled manner to achieve any desired rate of oxidation. As will be noted in later description, the perforated ring is moveable axially of the sample so that the rate of oxidation is dependent upon the progressive movement of the ring along the sample.

Another feature of the invention is the manner in which the sample is ignited. For this purpose, a special ignition means including a heat source, such as a tungsten lamp, is disposed externally of the sample-containing vessel, and the heat then is focused upon the sample by a special member, such as a lens.

The advantages of the entire arrangement will be considered subsequently in greater detail. For the present, it might be noted that both the ignition of the sample and its rate of oxidation are closely controlled to achieve essentially complete combustion without loss of sample. Loss of any products of combustion is avoided by utilizing the sealed, self-contained system which, preferably employes filters in the vacuum line for particle-collecting purposes. Control of ignition may be accomplished by varying the intensity of the heat source, while the normal pressure surge upon ignition also can be kept within control by reducing the interior pressure of the vessel.

After the sample has been ignited, the reduced pressure is instrumental in removing the products of combustion from the vessel so that the burning is not smothered by these products. Also, the lowered pressure helps keep any water which may be formed as a combustion product in the vapor phase so that it can leave the combustion apparatus. Further actual controls of the rate of oxidation may be accomplished by means of the moveable hollow ring and by further adjustments in the oxygen supply and the vacuum.

The invention is illustrated in the accompanying drawing in which FIG. 1 is a schematic of the assembled apparatus, certain portions of the apparatus being broken away to show underlying elements, and FIG. 2 is a perspective of the burner ring.

Referring to FIG. 1, the illustrated apparatus includes a combustion chamber or vessel 1 preferably formed of transparent borosilicate glass, the vessel being cylindrical in form and having a closed bottom portion 2. Disposed within vessel 1 is a sample holder 3 which, as may be seen, is in the form of a three-legged spike resting upon bottom 2, the sample to be tested, shown as a cylinder 4, being arranged on the spike in a rolled form extending axially of the vessel. Holder 3 also may be formed of borosilicate glass. Best results appear to be obtained if the chamber or vessel 1 is approximately eight inches longer than rolled-up sample 4.

To promote combustion of the sample, oxygen or other gaseous oxidants may be directed toward it through a hollow, perforated burner ring 6, which has a feed line 7 in the form of a hollow length of tubing. As shown, this tubing communicates with the ring at one end and has its other end projecting upwardly and outwardly of the vessel for connection with a source of the gaseous oxidant.

Ring 6 is perforated preferably being provided with small diameter holes 8 which, referring to FIG. 2, are evenly spaced on the inside upper portion of the ring so as to direct the flow of the oxygen slightly upward against the roll of burning material which the ring encircles. It also should be noted that tube 7 not only acts as a oxygen-feed line, it further serves as a means for moving ring 6 axially of the chamber and the sample roll so as to control the rate of oxidation of the sample. In other words, ring 6 is supported entirely by tube 7 so that movement of the tube progresses the ring in a desired manner. Although the movement presently is intended to be manually accomplished, it is apparent that any other form of drive could be employed.

The upper end of vessel 1 is open but, as shown, it is provided with a cover member 9 specially formed preferably of Teflon (a polytetrafluoroethylene polymer registered by Du Pont de Nemours and Company) to make a gas-tight, press-fit seal with the upper edges of the vessel. Tube 7 projects upwardly through cover 9 and, as would be expected, the opening provided in cover 9 for this tube is sealed in any suitable manner to permit a pressure reduction of the interior of the vessel. A vacuum gage 11 is carried by cover 9 to show the pressure within the chamber, and a valve 12 is associated with the vacuum gage to permit the introduction of air into the chamber upon completion of the oxidation.

As has been indicated, one of the features of the present invention is the fact that the interior pressure of vessel 1 can be reduced and, to accomplish this purpose, a conventional vacuum pump 13 is communicated with the vessel by a line 14. Also, to collect combustion gases, a relatively large evacuated cylinder 16 may be employed and the gases collected in the cylinder or absorbed in an appropriate absorbent.

Between vacuum line 14 and the vessel is an appropriate filter arrangement 17 which, as far as the present invention is concerned, can be in any desired form. As shown, the filter arrangement employs upper and lower sections 17(a) and 17(b), section 17(b) being formed of a Teflon ring on which is mounted a filter paper 18 which covers an opening 19 provided in cover member 9. Upper section 17(a) preferably is formed of brass and is provided with a wire cloth screen 21 which, when the upper and lower sections of the filter are fitted together as by a press fit, bears against the filter paper and supports it particularly when a negative pressure is applied to the top of the filter apparatus. The upper part of section 17(a) has a short section of tubing coupled to vacuum line 14 and the filter arrangement as a whole may be fixed to the cover in any appropriate manner.

Another important feature of the invention is the apparatus used for initially igniting the sample, this apparatus including a 1500 watt or larger tungsten lamp 22 provided as a heat source, the lamp being mounted in a cylindrical metal light shield 23 provided on one of its sides a round hole through which the heat and light may pass. To control the intensity of the lamp, a variable voltage transformer may be employed, this transformer being coupled in the usual manner to a 110 volt A.C. source. Ignition is accomplished by employing a condensing lens 26 mounted on a moveable stand 27 to focus the heat and light emitted from the lamp onto a particular spot on sample 4. As will be appreciated, the heat source, as well as lens 26, both are moveable in three planes to facilitate focusing, the entire arrangement being generally known as a "burning glass" arrangement.

Operationally considered, an ashing process is started first by forming the sample into a roll which then is pushed over glass spike 3 so as to be centrally located within vessel 1. A small amount of spectrographically pure graphite can be placed on the upper part of the sample where it is desired to initiate the burning. Cover 9 and filter 17 then are placed on top of the cylinder, air inlet valve 12 closed and the filter output connected to the vacuum line which includes collection cylinder 16. Heat and light source 22 next may be focused in the obvious manner upon the graphite spot on the sample, a low voltage setting being employed at this stage so that the material will not ignite. Finally, the preparatory steps are completed by reducing the pressure within the chamber to about one-half an atmosphere, which pressure usually is maintained during the burning although, as indicated, the pressure may be varied according to the particular circumstances.

To ignite the sample, oxygen or other gaseous oxidants, is fed into the cylinder through ring 6 which, by means of tubing 7, is positioned slightly below the spot where ignition is to take place. Simultaneously, the voltage on the auto-transformer is increased to provide sufficient heat for ignition.

After burning commences, the rate of combustion is controlled by varying the flow rate of the oxygen and by varying the rate of movement of the hollow ring down the sample. A motor drive for the oxygen supply could be incorporated to make the operation automatic or remotely conducted. If desired, the sample can be moved as well as the hollow ring. After the sample is consumed, the oxygen and vacuum may be turned off and air allowed to enter the combustion chamber through valve 12. The cover can be removed as soon as atmospheric pressure, as registered on gage 11, is reached within the vessel.

Most of the residue of the combustion chamber can be removed by mechanical means through the use of a large Teflon policeman, the final cleaning can be accomplished with hot acids. The cover also can be washed with acid and the washings combined with those of the cylinder. The filter, with its adhering particles can be treated in a number of ways and, depending upon circumstances, it may be possible to remove the residue by a reverse flushing procedure. Alternatively, the filter paper itself can be dry- or wet-ashed.

The principle advantage of the present apparatus is that it is possible to completely contain the sample during the combustion and to collect all the products of combustion. For this reason, it is ideal for quantitative determinations. Also, a system of this type is invaluable where one is working with radioactive or toxic particals and gases. Other apparent advantages include the saving in time and cost over conventional dry or wet oxidation. For example, the cost of the reagents normally employed in a wet oxidation is considerably more than the oxygen used in the present system. The present apparatus permits a wide range of sample size.

Functionally, the apparatus permits an essentially complete oxidation of any volatile material with which the sample might be impregnated. Further, the apparatus permits a completely controlled combustion as well as ignition, the controls including the permissible variations in the rate of oxygen flow, the variations in the negative pressure and the progressive movement of the oxygen jets relative to the roll of material being consumed. Since only a relatively small part of the sample is being oxidized at any one time, the rate at which heat is given off is kept at a reasonable level. During ignition, the resulting pressure surge is kept within safe limits by the reduction in atmospheric pressure and this control of pressure also is a means of controlling the rate of oxidation of the sample. Further, the continuous evacuation of the combustion chamber serves to remove the products of combustion so the burning of the sample is not smothered. Another consideration is that the low pressure helps keep water formed as a combustion product in the vapor phase so that it can leave the combustion apparatus.

It also is to be noted that the gas outlet holes in burner rings 6 are directed upwardly to direct the heated products of combustion upwardly toward the chamber outlet. This feature permits the maintenance of a hot highly oxidizing atmosphere above the sample. The passage of volatile and other components of the sample through this highly oxidizing atmosphere further promotes complete combustion.

The ignition itself is advantageous in that it is accomplished without the introduction into the vessel of chemicals or hot wires. Also, the combustion can be initiated at any point on the sample and the limited area of the ignition itself tends to reduce unwanted pressures surge. A further control is that the temperature at the point of ignition can be varied over a wide range.

Obviously many modifications and variations of the present invention are possible in the light of the above teachings. It is, therefore, to be understood that within the scope of the appended claims, the invention may be practiced otherwise than as specifically described.

What is claimed is:

1. Apparatus for controlling the combustion of samples formed of oxidizable materials comprising a combustion vessel formed of a heat-transmissive sleeve having closure walls at each end, mounting means disposed internally of said vessel for supporting a sample medially of the vessel sleeve, burner means encircling said mounting means and adapted to direct a supply of combustion promoting gas toward said supported sample, a gas conduit having one of its ends communicating interiorly of said vessel with said burner and its other end communicating exteriorly of the vessel with a source of said supply, a pressure-reducing means, a pressure line communicating an end portion of said vessel interior with said pressure-reducing means, and means for igniting said supported sample, said ignition means including a heat source disposed outside of said vessel in a spaced relation thereto, and a heat-source focusing lens disposed between said source and said supported sample for focusing said source at a single point on said sample, whereby the sample can be ignited.

2. The apparatus of claim 1 further including means for producing relative motion between said burner and said sample mounting means for assisting in controlling the oxidation rate of the sample.

3. The apparatus of claim 1 further including a filter disposed between said pressure line and said vessel interior whereby effluent products of combustion drawn from the vessel interior by said pressure-reducing means are constrained to pass through said filter.

4. The apparatus of claim 1 wherein said burner is a perforated rigid ring and said burner conduit is a rigid pipe projecting through one of the vessel end closures, said conduit pipe being movable through said end closure whereby said burner can be moved relative to its encircled sample mounting means.

5. The apparatus of claim 4 wherein said perforations are formed on the inner portion of said ring and are directed toward said end portion of the vessel in communication with said pressure reducing means.

6. The apparatus of claim 1 further including means for controlling the intensity of said heat source, and means for controlling said pressure-reduction means whereby the ignition and combustion of said sample are controllable.

7. The apparatus of claim 1 wherein said heat source is a tungsten lamp, and said heat source control means is a variable voltage transformer.

References Cited in the file of this patent

UNITED STATES PATENTS 2,757,076    Deprez et al. _____ July 31, 1956
2,894,823    Chapin _____ July 14, 1959

OTHER REFERENCES

Foley's College Physics, Glathard, 4th edition, pp. 283–4, 526–7, Blakeston, Toronto, 1947. (Copy in Sci. Library.)

College Physics, Perkins, 3rd edition, pp. 243–244, Prentice-Hall, 1948, New York. (Copy in Sci. Library.)